United States Patent [19]

Mulholland

[11] Patent Number: 5,020,816

[45] Date of Patent: Jun. 4, 1991

[54] ADJUSTABLE FRAME WHEELCHAIR

[75] Inventor: Lawrence K. Mulholland, Santa Paula, Calif.

[73] Assignee: Mulholland Designs, Inc., Santa Paula, Calif.

[21] Appl. No.: 561,680

[22] Filed: Aug. 1, 1990

Related U.S. Application Data

[63] Continuation of Ser. No. 289,383, Jan. 30, 1989, which is a continuation of Ser. No. 109,777, Oct. 19, 1987, abandoned.

[51] Int. Cl.[5] .................................... B62M 1/14

[52] U.S. Cl. .................................... 280/250.1; 280/42; 280/647; 297/42; 297/44; 297/DIG. 4

[58] Field of Search .................... 280/250.1, 42, 647, 280/648, 649, 650; 297/16, 42, 44, 45

[56] References Cited

U.S. PATENT DOCUMENTS

| | | | |
|---|---|---|---|
| 2,592,025 | 4/1952 | Gray | 280/648 |
| 2,625,207 | 1/1953 | Duke | 297/DIG. 4 |
| 2,669,289 | 2/1954 | Usher et al. | 297/DIG. 4 |
| 3,601,430 | 8/1971 | Zwennis | 403/406.1 |
| 3,761,126 | 9/1973 | Mulholland | 297/DIG. 4 |
| 3,813,179 | 5/1974 | Priest | 403/353 |
| 3,968,991 | 7/1976 | MacLaren | 297/45 |
| 4,045,051 | 8/1977 | Igarashi et al. | 280/647 |
| 4,082,348 | 4/1978 | Haury | 297/DIG. 4 |
| 4,538,830 | 9/1985 | Nakao et al. | 280/647 |

FOREIGN PATENT DOCUMENTS

| | | | |
|---|---|---|---|
| 254718 | 11/1984 | France | 280/250.1 |

*Primary Examiner*—Mitchell J. Hill
*Attorney, Agent, or Firm*—Kenneth J. Hovet

[57] ABSTRACT

A wheelchair having opposing sideframes which comprise individual frame sections which are connected by a longitudinally and angularly adjustable joint. The frame sections include a fixed base section connected to linear bar sections. The bar sections are provided with lateral slots containing slidable fasteners. Link elements having fasteners that engage the slidable fasteners join together the bar sections. The joint is movable along the bar section slots and is rotatable about the link fasteners. Similarly, adjunct wheelchair assemblies may all be adjustably connected to the slidable fasteners of selected frame bar sections. The sideframes can include side braces and may be connected by laterally adjustable spacer bars.

41 Claims, 7 Drawing Sheets

ADJUSTABLE FRAME WHEELCHAIR

This is a continuation of application Ser. No. 07/289,383 filed Jan. 30, 1989 which is a continuation of application Ser. No. 07/109,777 filed Oct. 19, 1987, now abandoned.

BACKGROUND OF THE INVENTION

Special needs of wheelchair users dictate an unending variety of alterations to a basic wheelchair structure. Unfortunately, virtually all improvements for making a wheelchair more adaptable are limited to just one or two components. For example, U.S. Pat. Nos. 3,815,586 and 4,073,537 describe universally adjustable body support pads. The pads are connected to a fixed non-adjustable wheelchair framework. U.S. Pat. No. 4,592,570 describes a seat frame which is adjustably attached to a fixed main frame. The frame itself cannot be altered. U.S. Pat. No. 4,595,212 sets forth a fixed side frame having means for adjustable connection with wheel assemblies. Again, adjustment of the sideframe is not possible.

Adding to the difficulty of providing adjustability to wheelchair components, is the desire to make the chair collapsible. This entails more complicated mechanisms, more cost and more weight. It severely limits the overall adaptability of present day wheelchairs.

SUMMARY OF THE INVENTION

A wheelchair is provided having a framework comprising opposing sideframe structures which can be geometrically varied as desired. The sideframes may be adjustably spaced-apart by a folding assembly. The sideframes comprise individual frame sections having track means that is utilized in forming a wide variety of structural and supplemental connections. Link and attachment means are used to adjustably interconnect the frame sections to create a stable lightweight framework.

DESCRIPTION OF THE PREFERRED EMBODIMENTS

Figure 1:
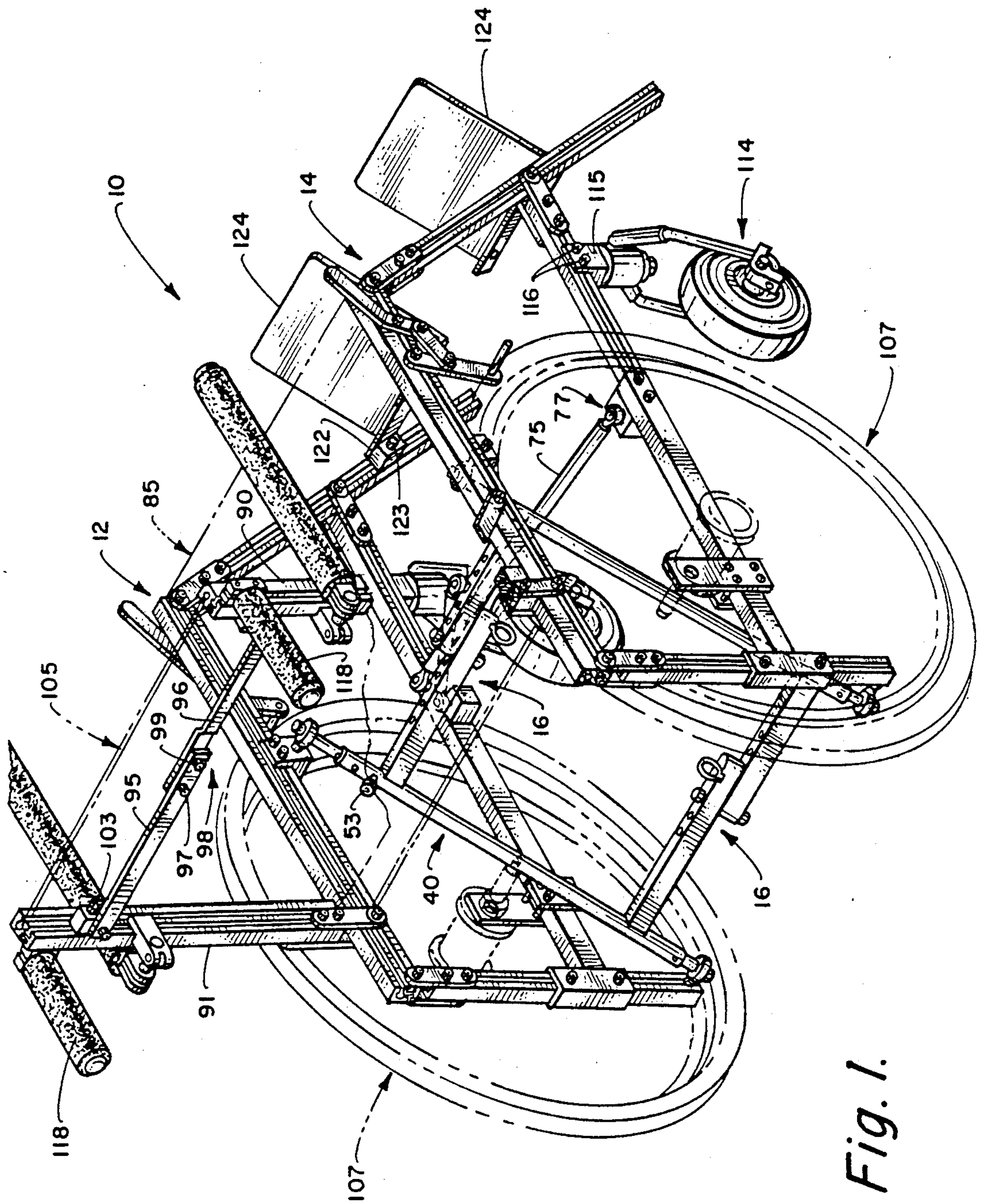
FIG. 1 is a perspective view of a wheelchair constructed in accordance with the present invention with the seat, backrest and drive wheels shown in phantom.
Figure 2:
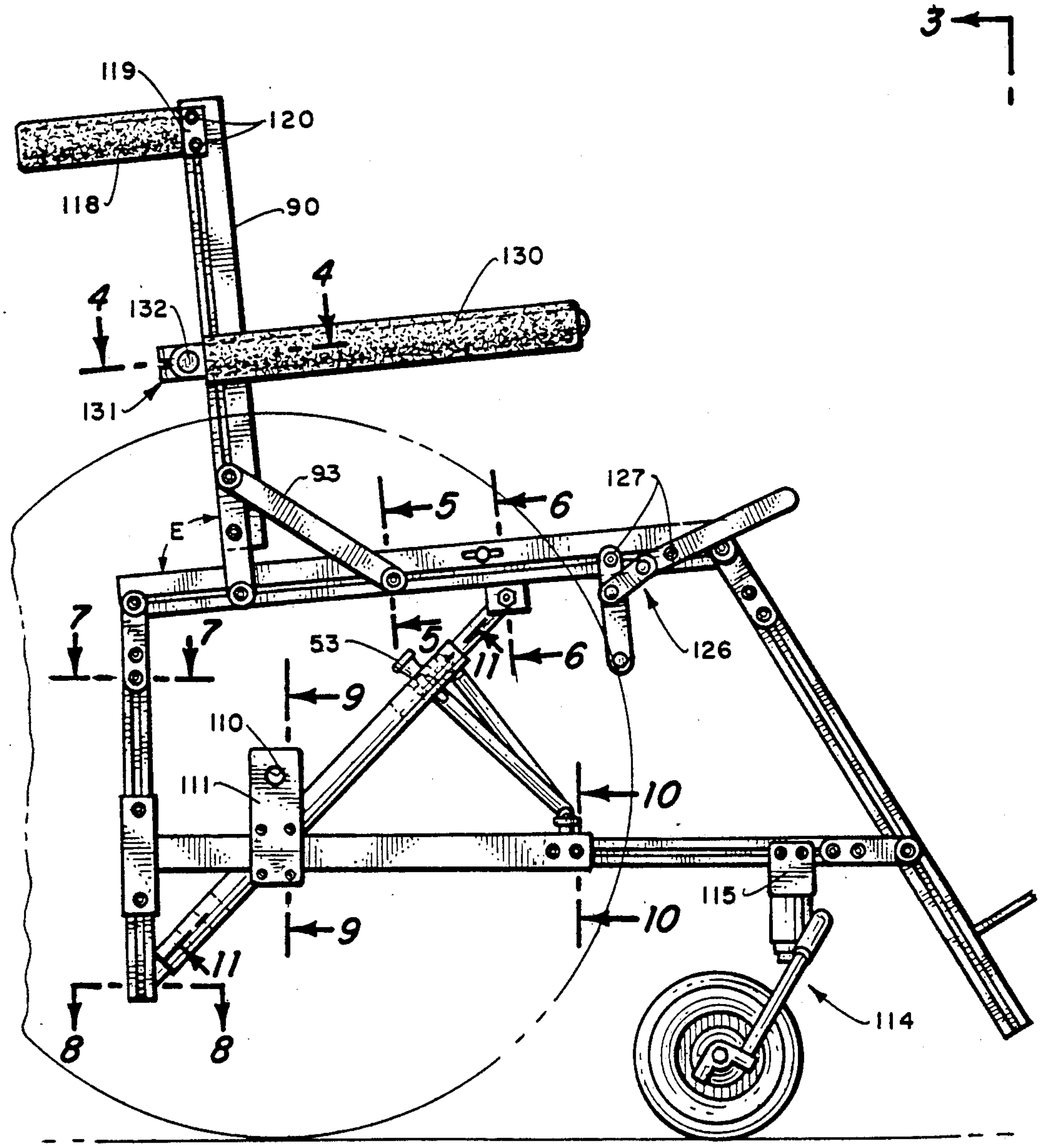
FIG. 2 is a side elevational view of the wheelchair shown in FIG. 1.
Figure 3:
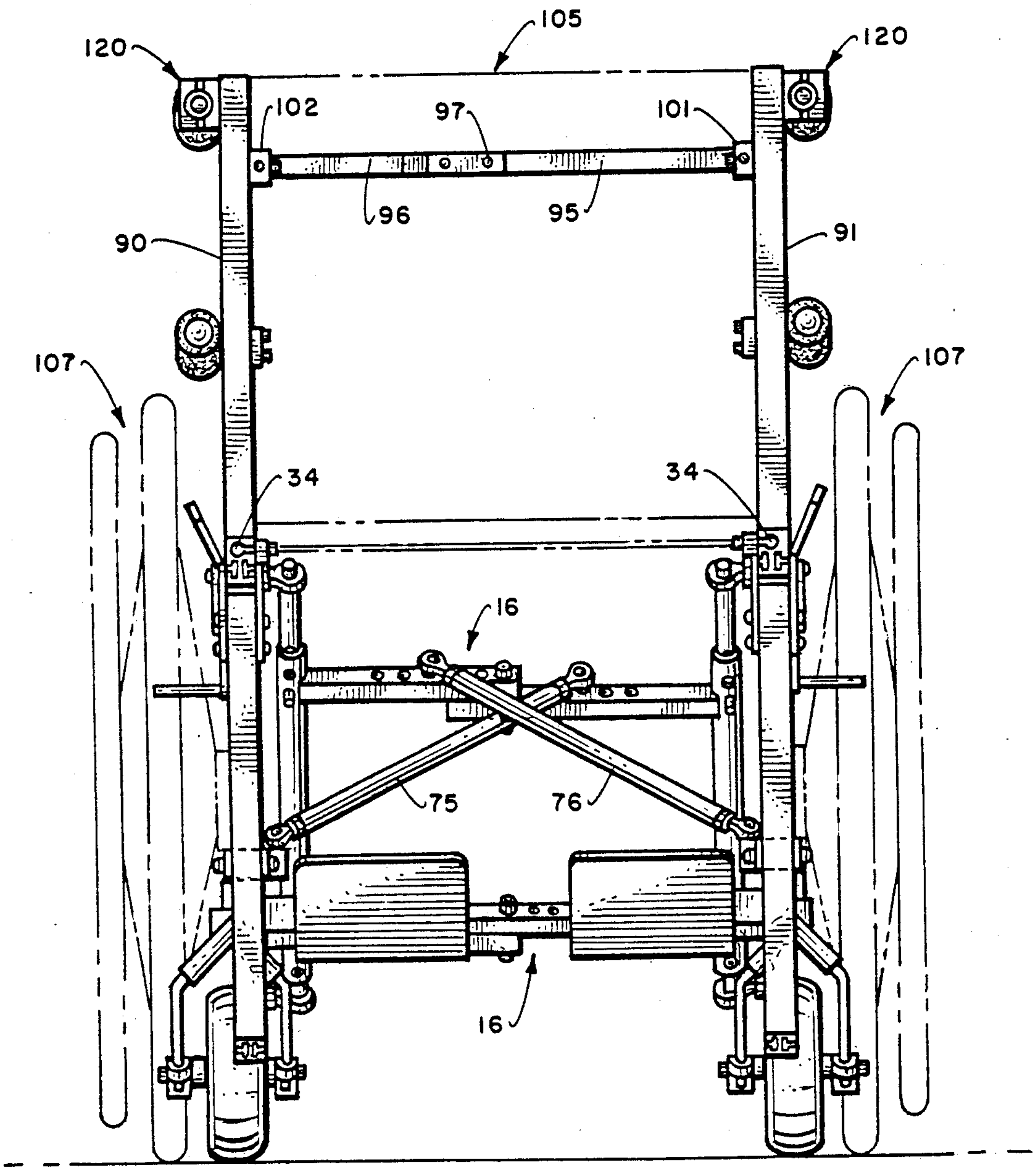
FIG. 3 is a front elevational view taken along lines 3—3 of FIG. 2.
Figure 4:
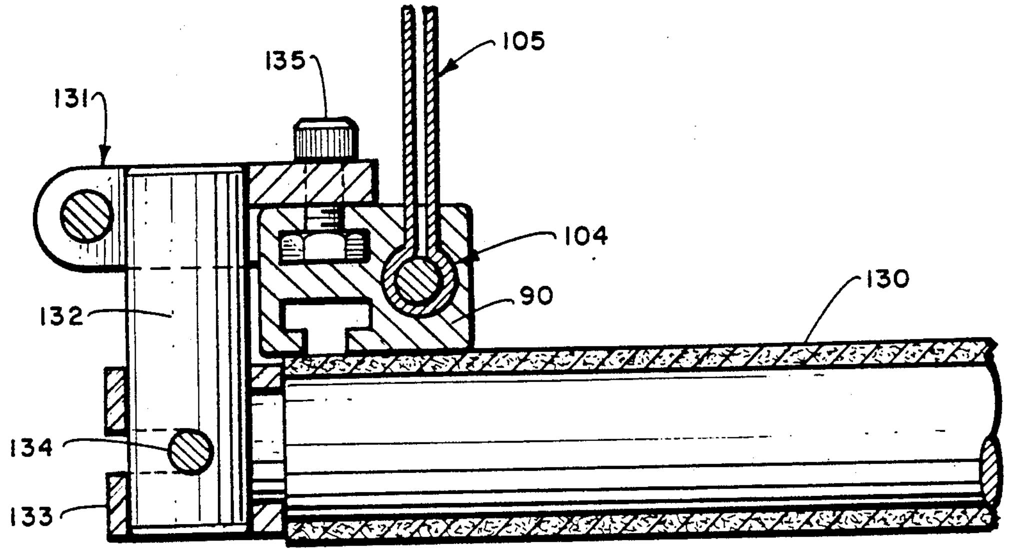
FIG. 4 is an enlarged fragmentary cross-sectional view taken along lines 4—4 of FIG. 2.

With reference to FIGS. 1–3 of the drawings, a comprehensive wheelchair design is shown incorporating the unique features of the present invention, The basic wheelchair framework comprises two generally parallel spaced-apart sideframes 12,14 which are usually configured to be mirror-images of each other. Although the sideframes may be fixed in a spaced-apart relationship by conventional cross-pieces (not shown), they are preferably movable by a folding assembly 16.

Figure 12:
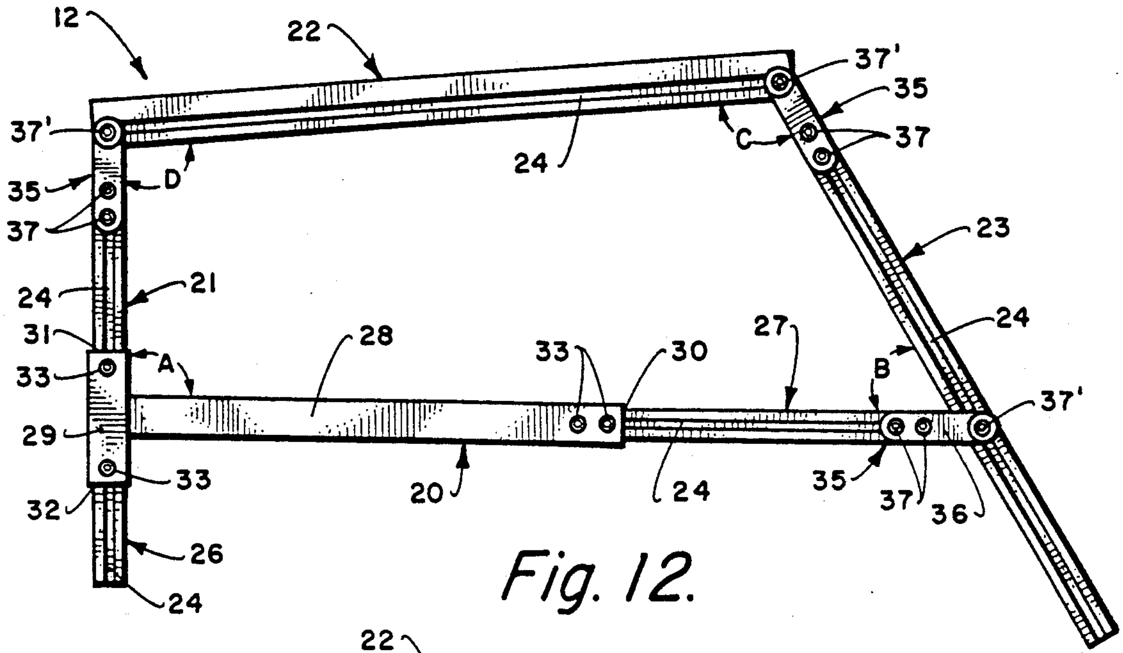
FIG. 12 is a side elevational view showing the sideframe of FIG. 1 without auxiliary attachments.
Figure 13:
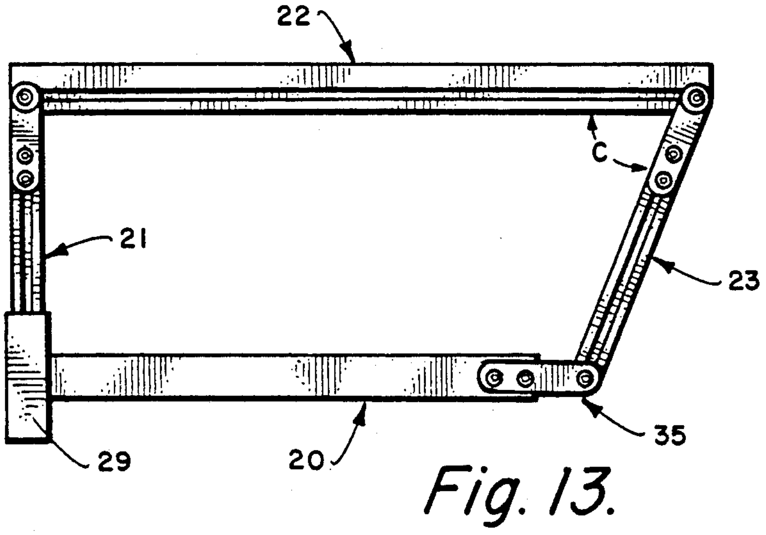
FIG. 13 is a side elevational view showing the sideframe of FIG. 12 in a different configuration and without the lower frame section.
Figure 14:
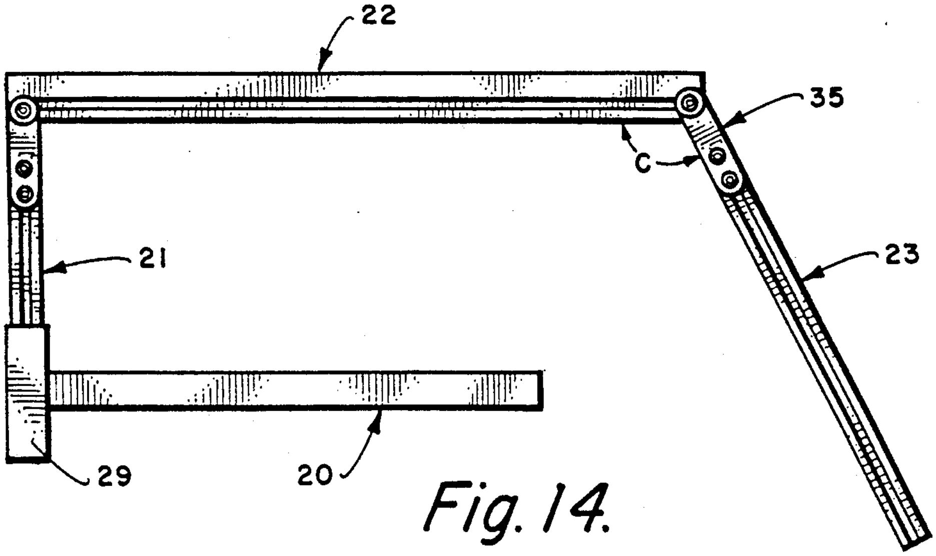
FIG. 14 is a side elevational view showing the sideframe of FIG. 13 in an open configuration.

With particular reference to FIGS. 12–14, each sideframe comprises a base section 20 and at least three discrete frame bar sections shown as upright section 21, upper section 22 and front section 23. The bar sections consist of linear structural elements preferably of lightweight extruded aluminum, aluminum alloy or composite plastic. Each section includes a track means which, as shown, comprises an undercut slot 24 extending laterally along at least one, and preferably two opposing bar section sides.

Most conveniently, the slots extend throughout the length of the inner face 38 and outer face 39 of each bar section. Each slot has a cross-sectional shape corresponding to the outline of a slidable fastener 23 which is retained therein. As best shown in FIGS. 4–8, the slots have a T-shaped cross-section and the slidable fasteners comprise a conventional nut having a threaded opening accessible through said slot.

As will be hereinafter apparent, the number of slidable fasteners contained in each track means will be dictated by bar section connections and the requirements of supplemental engagement means. Further, it will be appreciated that track means may include slotted strips or sliding bolt means and the like, secured to one or more of the bar section faces.

Base section 20 comprises an elongated part 28 secured to a transversely extending leg part 29. Each part has an outer end that includes attachment means for connection with a frame bar section. The attachment means comprises an outer bar opening 30 at the outer end of elongated part 28 including upper opening 31 and lower opening 32 at the opposing ends of leg part 29. An end of a frame bar section is inserted into a selected opening and adjusted longitudinally as desired. End fasteners 33 extend transversely through the outer end walls and engage corresponding slidable fasteners 25 in the bar section slots to secure the bar sections in place.

Preferably, the base section comprises straight hollow structural parts having quadrilateral cross-sections corresponding to, and slightly larger than, the quadrilateral cross-sectional shape of the frame bar sections. In this way, the bar sections can telescope into the base section openings and be readily adjusted longitudinally. It is also preferred to have leg part 29 extend about perpendicularly across the back end of the elongated part. In this manner, a fixed angular corner A will be formed to provide a strong foundation for the overall sideframe structure.

In the FIGS. 1–12 embodiment of the sideframes, upright section 21 extends upwardly from opening 31 and a lower bar section 26 extends downwardly from the lower bar opening 32. The longitudinal axis of both sections and the leg part are coextensive forming a straight backside to the sideframe. Note that the upright and lower sections have identical cross-sectional shapes and, in fact, the lower section 26 may simply be a continuation of upright section 21 that extends through leg part 29. Be aware also that use of the lower section is optional and it functions primarily to secure the lower end of a brace means in a manner to be hereinafter described.

Telescoping out from bar opening 30 is optional bottom frame bar section 27. This bar section serves as a linearly adjustable extension of elongated part 28. Its construction is the same as the lower and front bar sections. It includes slots 24 and slidable fasteners 25 which serve to adjustably secure it to opening 30 with end fasteners 33.

The outer end of the bottom section is joined to front section 23 by a tightenable link means 35. Although various types of H brackets, yoke bars, clamps and braces could be used for the link means, the preferred means is shown as connector elements 36 with link fasteners 37. The connector elements are flat generally rectangular plates having spaced-apart orifices through which the link fasteners extend. The link fasteners preferably comprise bolts which are threaded to engage the female threads of the slidable fasteners. Of course, other types of link fasteners could be used as dictated by the particular link means and track means being utilized such that the invention should not be limited by any specific fastening system.

The link fastener orifices are arranged to include at least two at a securement end portion of each connector element and one at an opposing pivot end portion thereof. As so arranged, link fasteners extending through the securement end orifices into engagement with the respective slidable fasteners, will serve mainly to firmly fix the element to the end of a bar section. However, the link fastener extending through the pivot end orifice into engagement with a slidable fastener on the adjacent connecting bar section, will function as a pivot until tightened. Thus, an angularly adjustable joint is formed between the connecting bar sections. Further, the joint will be longitudinally adjustable as a result of the slidable fastener on the adjacent bar section. Still further, the connector elements can be reversed for allowing either bar section to be pivotable.

With reference back to the connection of bottom section 27 to front section 23, a connector element is secured to the bottom section outer end with two securement end link fasteners 37. A pivot end fastener 37' extends through the pivot end orifice and engages a slide fastener from front section 23. Before the fasteners are tightened, the angle B between the bottom and front sections can be varied as desired. Also, the front section can be moved longitudinally relative to the bottom section outer end. Clearly, this allows for unlimited variety in size and geometric arrangement of each sideframe structure. Further, note that to strengthen the joints, the link means may be used, as shown, on both the inner and outer bar section faces.

In a similar fashion, angular and longitudinal adjustable link fastener joints can be formed with upper section 22 at the upper ends of front section 23 and upright section 21. As shown, the securement portion of each connector element is secured to the bar section upper ends. The pivot link fasteners 37' engage respective slidable fasteners at opposing ends of the upper bar section. Angle C between the front and upper bar sections and angle D between the upright and upper bar sections can be varied in the same manner as angle B. All three angles will also vary in accordance with the desired spacing between joints on the upper section and front section and, per the amount the bottom section and upright sections extend from the base section parts.

In the FIG. 13 embodiment, lower section 26 and bottom section 27 are omitted. The front section 23 is rotated inwardly forming an acute angle C and is attached to the elongated part 28. As shown, the securement portion of the connector elements are fixed to the outer end of part 28 and to the upper end of front section 23. This permits securement anywhere along the longitudinal extent of the front section. The sideframe configuration of FIG. 13 may be appropriate where leg support is not required or where obstructions at the wheelchair front must be minimized for desk or counter work.

FIG. 14 illustrates the basic sideframe construction of FIG. 13 in an open configuration. Here, the front section inclines outwardly from its upper end forming an obtuse angle C without connection to elongated part 28. This embodiment provides an ultra lightweight structure suitable for use by children or in sport applications.

It should be noted that upper bar sections 22 have a greater cross-sectional area than the front, bottom, upright and lower bar sections which, otherwise preferably have identical cross-sections. The increased area allows for the addition of a seat keyway 34 on inner faces 38. The seat keyway extends throughout the length of the upper bar section and includes an enlarged inner area 84. The enlarged area provides a means for retaining the expanded side edges 87 of seat 85.

Figure 5:
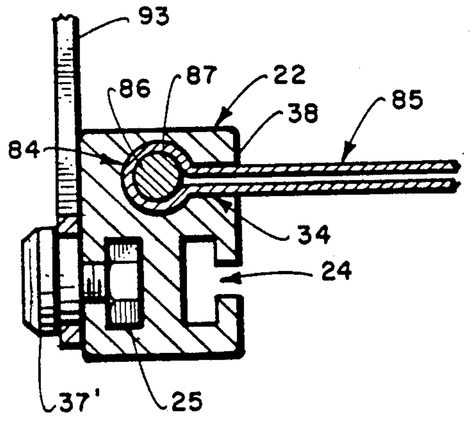
FIG. 5 is an enlarged fragmentary cross-sectional view taken along lines 5—5 of FIG. 2.
Figure 6:
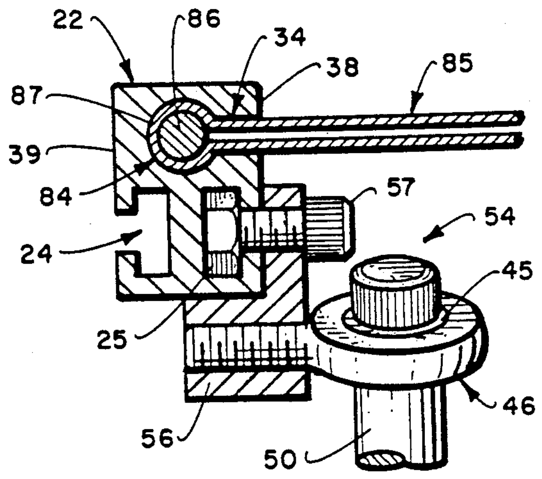
FIG. 6 is an enlarged fragmentary cross-sectional view taken along lines 6—6 of FIG. 2.
Figure 7:
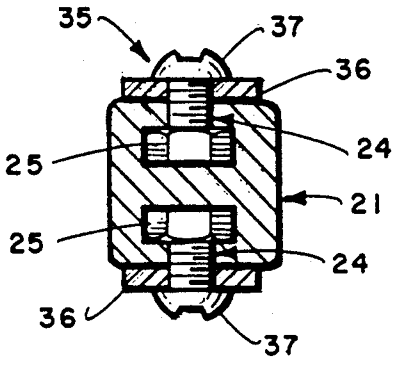
FIG. 7 is an enlarged fragmentary cross-sectional view taken along lines 7—7 of FIG. 2.
Figure 8:
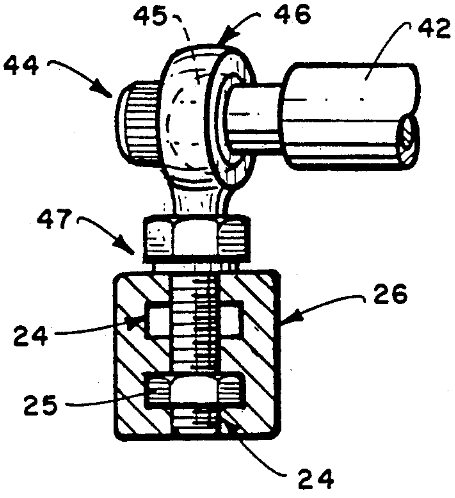
FIG. 8 is an enlarged fragmentary cross-sectional view taken along lines 8—8 of FIG. 2.
Figure 9:
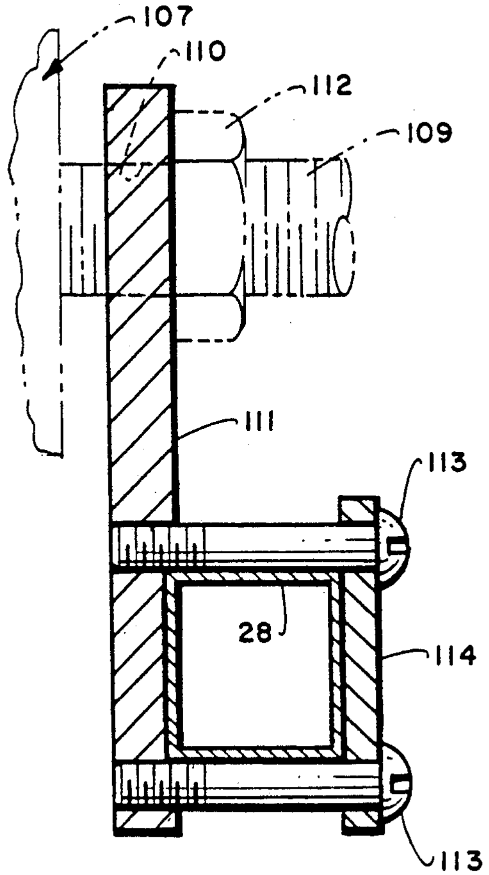
FIG. 9 is an enlarged fragmentary cross-sectional view taken along lines 9—9 of FIG. 2.

With reference to FIGS. 5 and 6, seat 85 preferably comprises a durable pliable material that spans the area between opposing upper bar sections. A seat engagement means is provided whereby the material is folded 180° to form the opposing edges 87,87 and, retainer rods 86 are inserted between the folds to expand the edges. The edges are then guided simultaneously into respective open ends of the seat keyways on each upper bar section. Free ends of the edge folds (not shown) may be secured by hemming or be drawn together by lacing or the like.

Since the seat material is pliable, such as with canvas, leather or reinforced Nylon fabric, it will flex and crease along its midportion when the sideframes are drawn together into a wheelchair closed position. It will be appreciated, however, that if the wheelchair is noncollapsing, a rigid seat with engagement edges could be used in place of the pliable seat material.

For heavy duty wheelchair applications, it may be desirable to strengthen the sideframe structures with brace means 40 as shown in the FIGS. 1-12 embodiment. The brace means may comprise an elongated member that connects upper section 22 with base section 20 or lower section 26. Most basically, it may simply consist of a shaft conventionally secured to the aforesaid sections. However, it is preferable that the brace means include means to accommodate the variable geometry of the sideframe. To this end, universal joint means are used to connect the brace to the frame sections at varying angular adjustments. Longitudinal adjustment means may also be used to vary the brace length and facilitate attachment along the length of a frame bar section.

With particular reference to FIGS. 2, 3, 6, 8 and 11, the brace means includes an elongated hollow brace member 41 having opposing upper and lower open ends. The lower end is provided with a stationary plug 42 which is secured therein by pin 43. Attached to the outer end of the plug is a lower universal joint assembly 44. This includes a ball fastener 45 having a ball end and a shaft end which is threadably engaged to the plug end. Surrounding the ball end and forming a universal joint therewith is annular joint fastener 46. The joint fastener includes a threaded portion that extends through base section orifices and engages corresponding threads in a lower bar section slidable fastener. A set nut and washer assembly 47 inhibits loosening of the fasteners.

The upper open end of brace member 41 contains longitudinal adjustment means which, as shown, comprises sliding shaft 50. The shaft includes orifices 51 that are axially spaced-apart and correspond to brace member orifices 52. A releasable pin 53 engages selected aligned orifices of the shaft and brace member in accordance with the desired axial extent of the plug (and overall brace length).

In the same manner as with stationary plug 44, an upper universal joint assembly 54 is attached to the end of sliding shaft 50. The upper assembly includes a ball fastener 45 secured to the end of shaft 50. A joint fastener 46 forms a universal joint with the ball fastener. However, the threaded end of the joint fastener is secured to a joint block 56. The block facilitates a strong connection with upper section 22 and includes upper fasteners 57. The upper fasteners engage upper section slidable fasteners to secure the upper end of the brace means to the desired position along the upper section slot 24.

In some wheelchair applications, it may be desirable to move the upper assembly forward. Alternately, the sideframe height or width may be increased which, in turn, alters the variable corner angles B, C and D. In all of the above cases, simple adjustment of the brace means length will be all that is needed for disposing the brace means in the most suitable alignment. This is because the universal joint connections permit automatic angular movement at the point of connection. Consequently, the sideframe of the invention is provided with an effective strengthening means which does not at all detract from the sideframe's ability to change configuration.

The folding assembly 16 of the invention is most conveniently attached to opposing sideframes via the abovedescribed brace means. This eliminates additional multiple connections to the appropriate frame sections, saves cost, minimizes weight and prevents interference with sideframe adjustability. The assembly includes at least one pair of hinged spacer bars having lateral adjustment means for varying the distance between sideframes.

With reference to FIGS. 1–3, 10 and 11, an illustrative folding assembly is shown comprising a pair of upper spacer bars 60,61 and lower spacer bars 62,63. Each pair includes overlapping inner end portions having aligned openings through which a pivot shaft 64 extends. The shaft is secured by nut 65. The outer ends of each bar are secured to respective opposing brace members 41. The bar connections to each brace member preferably occur adjacent to the ends of the member. In this way, greater leverage occurs to pivot the assembly and move the sideframes in and out. Also, as a result of the bars being connected at spaced-apart locations on the brace member, a stronger more stable alignment occurs between the opposing sideframes.

The pivot shaft openings 66 are located at the inner end of outer bars 60,62 and at a location inwardly offset from the end of inner bars 61,63. The offset portions of the inner bars form locking arms 68. The arms swing beneath overlapping inner end portions of outer bars 60,62 when the bars are in straight alignment corresponding to a wheelchair open position. To secure the bars in straight alignment, the locking arms are provided with a lock pin 67 which is biased outwardly by spring 71 into corresponding lock openings 72 on the inner faces of outer bars 60,62. Lock ring 70 is pulled to withdraw the lock pin and permit the bars to pivot toward each other. This action results in the sideframes being drawn toward each other and disposes the wheelchair in a closed inoperative position.

The folding assembly lateral adjustment means comprises corresponding openings 66 which are spaced-apart at predetermined locations along the length of each bar. The desired spacing between sideframes can thereby be varied by inserting pivot shaft 64 through openings aligned in correspondence to the desired spacing. In such case, the amount of bar overlap will vary accordingly. Therefore, equally spaced-apart lock openings will be required to allow entry of the lock pin to secure the bars in straight alignment.

To enhance lateral stability of the wheelchair when in an open position, the folding assembly can include strut means to interconnect a spacer bar to an opposing sideframe. In FIGS. 1–3 and 10, crossing strut members 75,76 are shown connecting upper spacer bars with respective sideframe base sections. Ball joint means are used for end connections to allow unrestricted angular movement of the strut members with the spacer bars.

Figure 10:
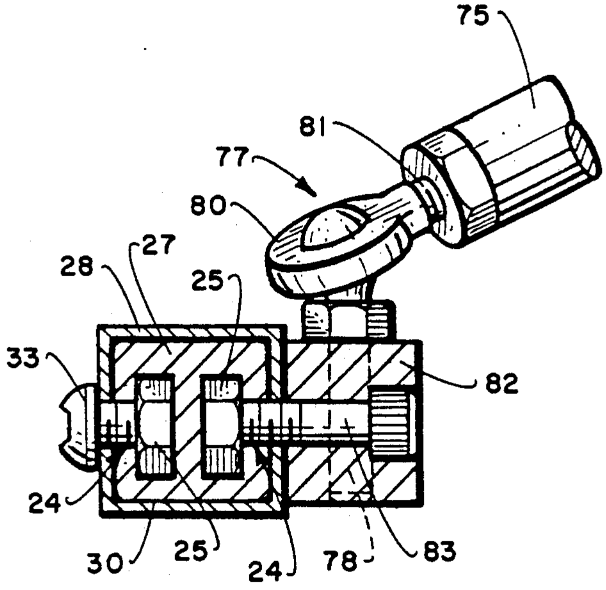
FIG. 10 is an enlarged fragmentary cross-sectional view taken along lines 10—10 of FIG. 2.
Figure 11:
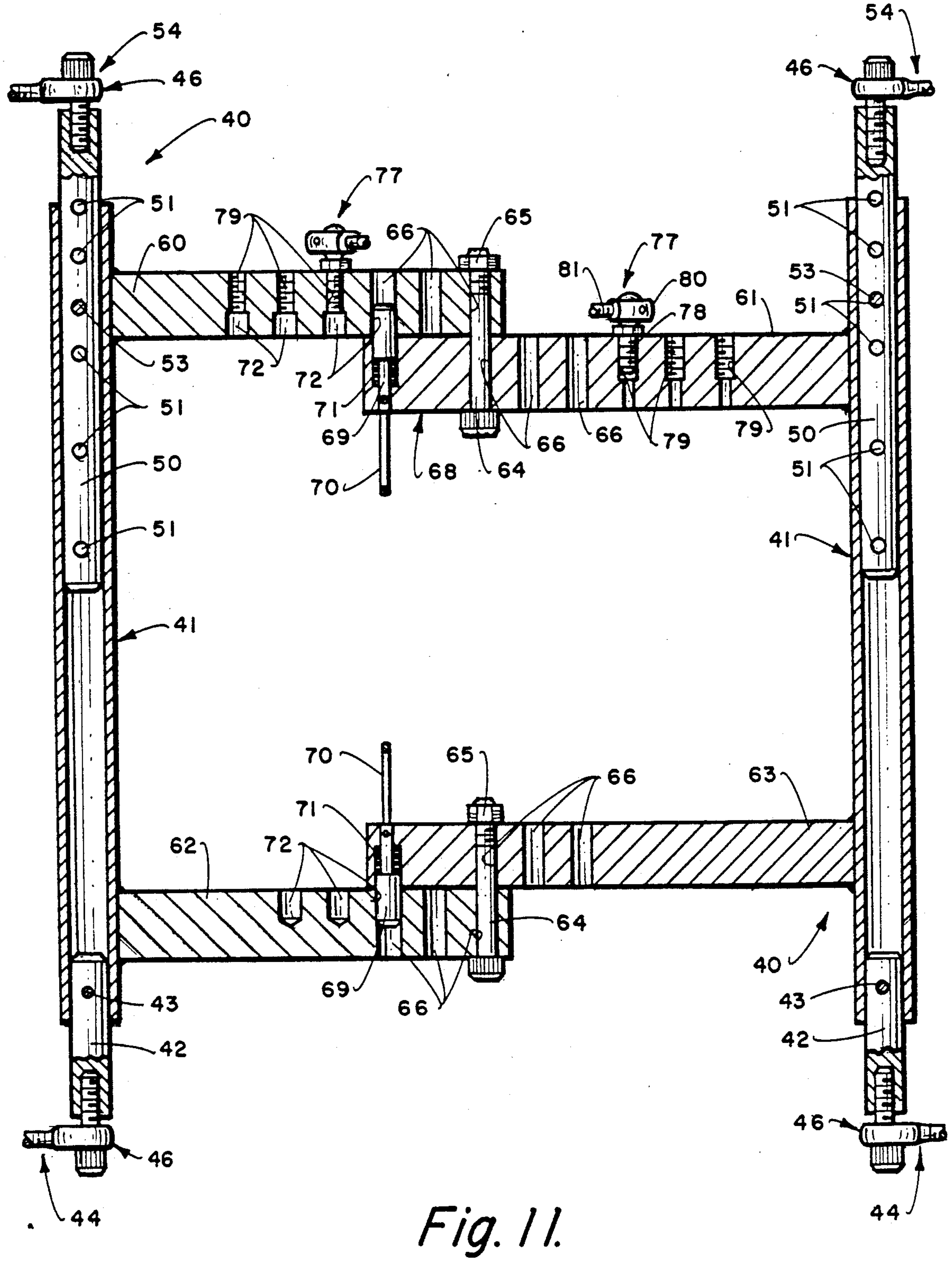
FIG. 11 is an enlarged fragmentary cross-sectional view taken along lines 11—11 of FIG. 2.

With particular reference to FIGS. 3, 10 and 11, the upper end of strut member 75 is connected to upper spacer bar 61 by upper ball joint means 77. The ball joint means includes a round head and ball fastener 78 that threadably engages strut opening 79 of the spacer bar. Ball ring 80 conformally engages the round head and includes a ring fastener 81 that extends axially by threaded engagement into the outer end of the strut member.

The lower end of strut member 75 is shown as connected with the outer end of elongated part 28 on the sideframe which is opposite of spacer bar 61. If desired, the lower connection could be to the adjacent bottom section 27. In the lower connection, the ball joint means is the same as in the upper connection. However, ball fastener 78 engages a strut block 82. The strut block, in turn, includes strut fasteners 83 which engage the slidable fasteners contained in bottom section 27.

Use of the strut block provides a stronger connection and allows movement of the lower connection onto and along the bottom frame section. In this regard, the upper spacer bars include additional strut openings 79 and, the strut member length can be varied by rotation of the threaded ring fasteners. It will be further appreciated that all of the above discussion applies equally to strut member 76. The only exception is that the upper end of strut member 76 is attached to spacer bar 60 and the lower end is connected to part 28 on the sideframe opposite spacer bar 60.

The wheelchair backrest means will now be described which demonstrates some of the unique advantages of the novel sideframe structure. The backrest means includes a pair of upstanding backrest frame bars 90,91 each joined to a respective upper bar section 22 by backrest link means. The cross-sectional shape of the backrest frame bars and upper bar sections are substantially identical. Therefore, the backrest link means can include connector elements 36 with link fasteners 37 and pivot end fasteners 37'.

As best shown in FIGS. 1 and 2, connector elements 36 are positioned at opposing sides of the lower end of each backrest frame bar. Link fasteners 37 engage corresponding slidable backrest fasteners contained within slots 24 in the same manner as with the sideframe bar sections. The pivot portion of each connector element extends beyond the end of the backrest bar and overlies respective inner and outer faces of the upper bar section. Pivot link fasteners are then used to engage corresponding slidable backrest fasteners in the upper bar section slots.

To strengthen the backrest joints, the backrest link means may include an angle bar 93. The upper end of each angle bar is positioned to overlie the upper end of an outer face connector element. It is then secured, along with the connector element by a link fastener common to both. The angle bar lower end includes a pivot fastener 37' that engages a corresponding slidable fastener in the upper bar section slot. With the above arrangement, it can be seen that the backrest bars may be readily moved longitudinally along the upper bar sections. They can also be tilted as desired to vary angle E with the upper section.

To provide upper backrest support, a pair of hinged support arms 95,96 are used to interconnect with opposing upper portions of the backrest bars. The arms are hinged at inner ends by support pin 97. The arms include a lock means to releasably maintain an open collinear position. The lock means comprises hook 98 at an extended portion of arm 95 that engages a hook pin 99 projecting from arm 96 when the arms are in longitudinal alignment.

The opposing outer end of each support arm is hinged to a respective arm block 101,102. Each block is provided with arm fasteners 103 that engage slidable backrest fasteners in the backrest bars. This connection allows adjustment and movement of the support arms up and down the backrest bars.

In the same same way as with the upper bar section seat keyways, the backrest bars include backrest keyways 104. A back support structure 105, shown in phantom in FIGS. 1 and 3, includes enlarged opposing side edges which slide into the keyways at the open end of each backrest bar. The back support structure can be rigid as with a non-collapsing wheelchair, or it can be flexible such as with the seat material.

Conventional wheelchair drive wheels 107 (depicted in phantom in FIGS. 1 and 3) are secured to the elongated part 28 of respective opposing base sections. The extended axle 109 of each drive wheel extends through an opening 110 in axle plate 111 and is fixed thereto by axle nut 112. Plate fasteners 113, that extend through clamp plate 114 and threadably engage the axle plate, draw the plates against opposing sides of the elongated part. This clamping action secures the wheels in place. It also permits adjustment of wheel location anywhere along the length of the elongated part.

To exemplify the advantages of the invention, it will be appreciated that attachment of adjunct wheelchair assemblies (such as footrests, casters, armrests, handles and body support pads), can all be accomplished with supplemental connector means in conjunction with the slidable fasteners of the novel frame bar sections. Use of the above, in cooperating relation with frame bar track means, allows all supplemental connections to be semi-permanent and adjustable. This feature together with the infinitely variable sideframe geometry, makes it possible for a single wheelchair to be adaptable for an endless variety of special needs and uses.

To illustrate the above, note conventional caster assemblies 114 which are secured to the forward position of bottom bar section 27 by a caster block means. Such means provides a supplemental connector junction whereby a caster assembly is connected to caster blocks 115. The block, in turn, includes block fasteners 116 which engage slidable fasteners in the bottom bar section. The combined assembly can be moved, as desired, anywhere along lateral slot 24.

Similarly, handles 118 are joined to the upper portion of respective backrest bars by supplemental means comprising a handle connector block 119. The block is split to frictionally engage the tubular handle base. Threaded handle fasteners 120 tighten the block to the handle. The fasteners also engage corresponding slidable backrest fasteners in the backrest bars.

In a similar fashion, supplemental connector means, shown as footrest block 122 with fasteners 123, interconnect footrest plates 124 to slidable fasteners in front bar section 23. Even more simply, a toggle brake assembly 126 includes brake fasteners 127 which pivotably connect brake arms directly to the upper bar section via engagement with corresponding slidable fasteners.

In a more detailed manner, armrests 130 are joined by a supplemental armrest mounting means to respective backrest bars 90,91. The mounting means includes a split block 131 securing a transverse shaft 132. The shaft rotatably supports the handle by engagement with housing 133 at the handle base. Peg 134 extends from the shaft into the slot and impinges the slot end to limit, in a predetermined manner, up and down rotation of the handle. The split block 131 includes armrest fasteners 135 which engage corresponding slidable backrest fasteners in the backrest bars.

While the invention has been described with respect to preferred embodiments, it will be apparent to those skilled in the art that various modifications and improvements may be made without departing from the scope and spirit of the invention. Accordingly, it is to be understood that the invention is not to be limited by the specific illustrative embodiments, but only by the scope of the appended claims.

I claim:

1. In a wheelchair having a seat, backrest and wheels, the improvement comprising:

opposing adjustable sideframes supporting said seat, backrest and wheels, each sideframe being adjustably fixed in a predetermined configuration comprising a base section, an upright section, an upper section and a front section, said upright section extending upwardly from said base section to the upper section, said upper section extending from said upright section to the front section, said front section extending downwardly from said upper section, said upright section and said front section each being connected to said upper section by a respective tightenable link means, said upright, upper and front sections each having a track means comprising a longitudinal slot containing at least one slidable fastener which is movable along said slot whereby said link means can engage a corresponding slidable fastener at any predetermined location along the length of said slot and form a tightenable adjustable joint between respective upright, upper and front sections.

2. The wheelchair of claim 1 wherein said link means includes connector elements with a link fastener for engagement with said corresponding slidable fastener.

3. The wheelchair of claim 2 wherein said slidable fastener is provided with a threaded opening and is positioned within said slot so that said opening is accessible for engagement with said link fastener.

4. The wheelchair of claim 3 wherein said upright, upper and front sections have a quadrilateral cross-sectional shape and said slot extends longitudinally along opposing sides of said upright, upper and front sections.

5. The wheelchair of claim 1 wherein said base section comprises a leg part secured to an elongated part, said elongated part extending outwardly from said leg part.

6. The wheelchair of claim 5 wherein said leg part extends transversely to said elongated part.

7. The wheelchair of claim 6 wherein said elongated part has a back end and said leg part extends across said back end.

8. The wheelchair of claim 5 including a bottom section connecting said front section to said base section.

9. The wheelchair of claim 8 wherein said elongated part has an open outer end engaged with said bottom section and said leg part has an open outer end engaged with said upright section.

10. The wheelchair of claim 9 including a lower section extending downwardly from said leg part and including a brace means connecting said upper section to said lower section.

11. The wheelchair of claim 10 wherein said brace means is longitudinally adjustable and is connected to said upper section and said lower section by universal joint means.

12. The wheelchair of claim 11 wherein said universal joint means includes a joint fastener for engagement with a slidable fastener.

13. The wheelchair of claim 1 wherein said opposing sideframes are interconnected by a folding assembly for allowing said sideframes to be moved laterally toward each other.

14. The wheelchair of claim 13 wherein said folding assembly includes at least one pair of spacer bars having pivotally interconnected inner end portions and outer ends attached to a respective sideframe.

15. The wheelchair of claim 14 wherein said folding assembly includes lateral adjustment means for varying the spacing between opposing sideframes.

16. The wheelchair of claim 15 wherein said lateral adjustment means comprises spaced-apart pivot openings at each of said inner end portions and a removable pivot pin extending through selected ones of said openings for releasable securement of said inner end portions.

17. The wheelchair of claim 13 including brace means interconnecting at least two of said frame bars on a sideframe.

18. The wheelchair of claim 17 wherein said folding assembly includes pivoted spacer bars having opposing outer ends secured to a respective sideframe brace means.

19. The wheelchair of claim 18 wherein said folding assembly includes strut means connecting a sideframe to a spacer bar.

20. The wheelchair of claim 1 wherein said upper section is provided with a seat keyway and said seat has opposing side edge seat engagement means for retention by said seat keyway.

21. The wheelchair of claim 1 wherein said backrest comprises a pair of backrest frame bars each having a backrest keyway and each being connected to a respective sideframe upper section and, a back support structure having opposing side edge back engagement means for retention by said backrest keyway.

22. The wheelchair of claim 21 wherein said backrest frame bars include lateral slots which contain slidable backrest fasteners and each of said backrest frame bars are connected to a respective sideframe upper section by backrest link means that include link fasteners that engage said slidable backrest fasteners.

23. The wheelchair of claim 1 wherein said front section is connected to said base section.

24. In a wheelchair having a seat, backrest and wheels supported by a framework, the improvement comprising:

opposing spaced-apart sideframes each comprising a base section and frame bar sections, said sections assembled to form at least a three-cornered structure having a non-adjustable fixed angular corner with at least two angularly adjustable corners which are securable in a predetermined configuration by a tightenable link means, said frame bar sections comprising an upright section, an upper section and a front section, said upright section extending from the base section to said upper section to form an upright backside to said sideframe, the upper section extending from said upright section to said front section and said front section extending downwardly from said upper section, said frame bar sections each having a track means comprising a longitudinal slot containing at least one slidable fastener which is movable along said slot so that said link means can engage said slidable fastener and interconnect at least said upright section with said upper section and said front section with said upper section.

25. The wheelchair of claim 24 wherein said link means includes a link fastener and connector elements which are securable to said angularly adjustable corners by engagement of said link fastener with said slidable fastener.

26. In a wheelchair having a framework supporting a seat, backrest and wheels, wherein the framework includes an improvement comprising:

opposing sideframes each comprising at least three discrete linear frame bar sections adjustably joined together in a three-sided structure by a tightenable link means, said frame bar sections comprising an upright section connected to an upper section which is connected to a front section, said frame bar sections each having a track means comprising a longitudinal slot which contains at least one slidable fastener which is movable along said slot whereby said link means can engage said slidable fastener and interconnect respective frame bar sections in predetermined angular and longitudinal orientations; and, a base section connected to said upright section.

27. The wheelchair of claim 26 wherein said upper section includes a seat engagement means for providing a connection with said seat.

28. The wheelchair of claim 27 wherein said seat is provided with opposing enlarged side edges and said seat engagement means comprises a seat keyway for connection with said opposing enlarged side edges.

29. The wheelchair of claim 27 wherein said backrest comprises a back support structure connected to a pair of backrest frame bars each having slidable backrest fasteners and a backrest keyway.

30. The wheelchair of claim 29 wherein said back support structure includes enlarged opposing side edges for engagement with a backrest keyway on a respective backrest frame bar.

31. The wheelchair of claim 29 including an adjustable arm rest having an armrest mounting means with fasteners for engagement with the slidable backrest fasteners on respective backrest frame bars.

32. The wheelchair of claim 31 including adjustable handles having handle connector means with fasteners for engagement with the slidable backrest fasteners on respective backrest frame bars.

33. The wheelchair of claim 29 including support arms pivoted together at one end and pivoted to arm block means at opposing ends for providing adjustment of said support arms on said backrest frame bars, each arm block means having an arm fastener for engagement with the slidable backrest fasteners on respective backrest frame bars.

34. The wheelchair of claim 33 wherein said support arms include arm lock means for releasably retaining said support arms in longitudinal alignment when said sideframes are in a fully spaced-apart position.

35. The wheelchair of claim 26 including a folding assembly connected to each sideframe for releasably and adjustably spacing one sideframe from the other.

36. The wheelchair of claim 35 wherein said folding assembly includes at least one pair of hinged spacer bars interconnecting said sideframes having a laterally adjustable pivot means for selectively adjusting the spacing between said sideframes.

37. The wheelchair of claim 36 including strut means interconnecting a sideframe to a spacer bar adjacent an opposing sideframe.

38. The wheelchair of claim 37 wherein said strut means is connected to said sideframe and spacer bar by ball joint means.

39. The wheelchair of claim 37 including a brace member interconnecting two of said frame bar sections.

40. The wheelchair of claim 39 wherein said brace member is longitudinally adjustable and includes brace connector means having fasteners for engagement with slidable fasteners on said frame bar sections.

41. The wheelchair of claim 40 wherein said spacer bars have opposing ends secured to said brace members on opposing sideframes.

* * * * *